Dec. 19, 1950 A. ETIENNE 2,534,903
PROCESS FOR SEPARATING BY LIQUEFACTION GASEOUS
MIXTURES INTO THEIR CONSTITUENTS
Filed July 13, 1945
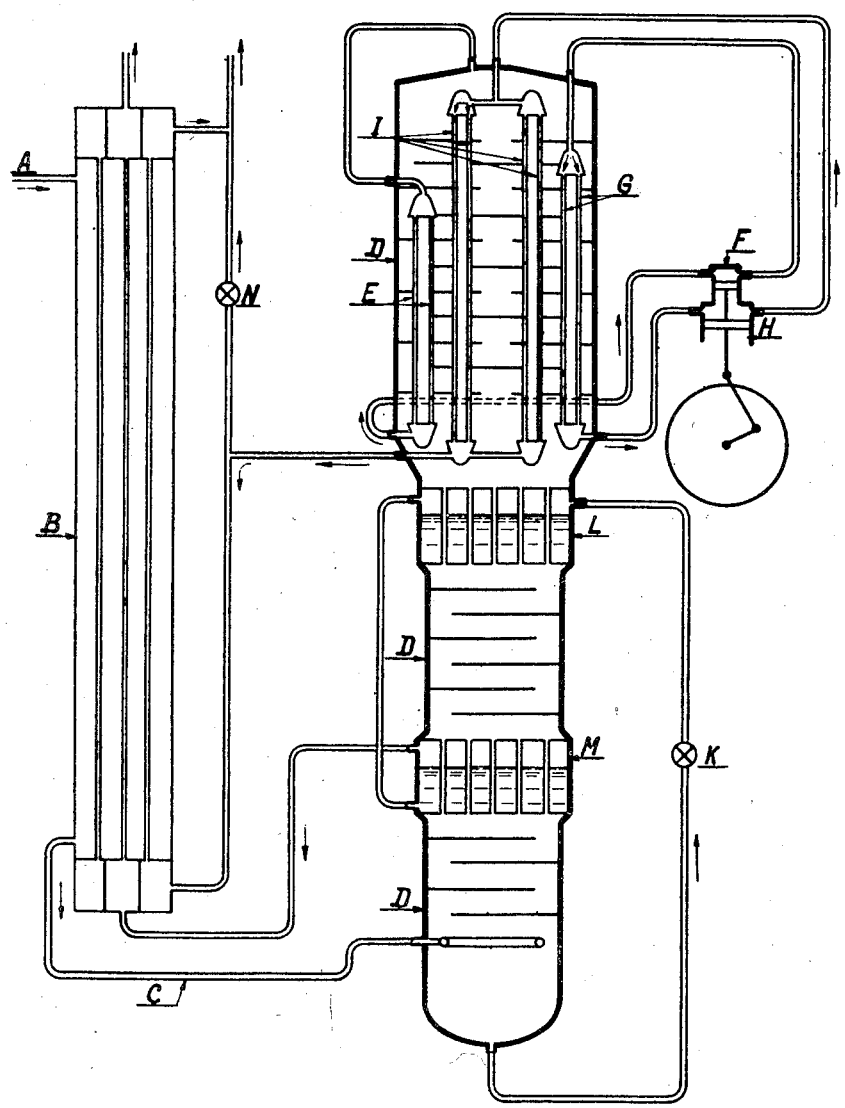
Inventor
Alfred Etienne
By
Pennie Davis Marvin & Edmonds
Attorneys Patented Dec. 19, 1950

2,534,903

UNITED STATES PATENT OFFICE 2,534,903

PROCESS FOR SEPARATING BY LIQUEFACTION GASEOUS MIXTURES INTO THEIR CONSTITUENTS

Alfred Etienne, Paris, France, assignor to L'Air Liquide, Societe Anonyme pour l'Etude et l'Exploitation des Procedes Georges Claude, Paris, France Application July 13, 1945, Serial No. 604,880
In France December 19, 1940

6 Claims. (Cl. 62—175.5)

The present invention relates to a process for the separation of gaseous mixtures comprised of gases having relatively low boiling points into their constituents or into groups of constituents, according to which process the higher boiling constituent or constituents are liquefied by cooling of the gaseous mixture under pressure, and cold is produced by expansion, with production of external work, of the gaseous effluent of the partial liquefaction, the cooling of the gaseous mixture being effected by putting it in heat exchange relation with the expanded gas. It is to be understood that, in the above characterisation as well as in the following specification or claims, the expression "gaseous mixture" designates, unless otherwise stated, the treated gaseous mixture which is being subjected to partial liquefaction and the composition of which continuously varies as constituents condense therefrom under the cooling action to which it is subjected.

The process of the invention is more particularly applicable to the extraction of hydrogen in a more or less pure state from its mixtures with other gases of higher boiling points. In order to facilitate the explanation, it will be described hereinafter with reference to such application.

It is known that the quantity of the gaseous mixture rich in hydrogen which has escaped liquefaction, and which, for the sake of simplicity, shall be designated by "hydrogen" in what follows, is smaller than the quantity of the gaseous mixture which it serves to cool and, consequently, the refrigerating effect it exerts on the gaseous mixture is too weak, alone, to produce a sufficiently complete condensation of the constituents less volatile than hydrogen. In order to improve this refrigerating effect, I have proposed, in Patent 1,878,123, filed in U. S. A., October 30, 1926, and patented September 20, 1932, to cool the treated gaseous mixture, at the end of its path, not only by means of the expanded hydrogen, but also by means of the cold compressed hydrogen coming from the separation and which is thus reheated prior to its expansion. In this process, the whole of the necessary refrigerating effect is produced by the separated hydrogen. The refrigerating effect to which is subjected the gaseous mixture being separated at the lowest temperatures it has to attain and which serves to condense the lowest boiling constituents other than the hydrogen contained in the gaseous mixture may therefore be insufficient. The process according to the present invention affords a means of increasing, in this known process, the refrigerating effect produced at the lowest temperatures.

In the process according to the present invention, the expansion of the reheated hydrogen under pressure which has served for the cooling of the gaseous mixture is effected in at least two successive stages, and the hydrogen which is discharged at each of the expansion stages serves for the cooling of the gaseous mixture where it is already cooled by the hydrogen under pressure which has not yet been expanded. When applied to the production of hydrogen, the process according to the invention therefore consists in passing at least three times in succession, the separated cold hydrogen in heat exchange relationship with the gaseous mixture being separated, the hydrogen being subjected to expansion with production of external work between two successive heat exchanges. Generally stated, the process according to the invention consists in causing the gaseous effluent of the separation of the treated gaseous mixture to pass at least three times in succession, in parallel, in heat exchange relationship with the gaseous mixture being separated, said gas being subjected to expansion with production of external work between two successive heat exchanges.

The present invention is applicable to the extraction of hydrogen from coke oven gases, comprising hydrogen and other gases of not so low boiling points: nitrogen, carbon monoxide, methane. Another application of the invention will be hereinafter described in conjunction with the accompanying drawing.

In the production of synthetic ammonia, nitrogen is generally obtained at least in part from atmospheric air and therefore contains argon. Moreover, the hydrogen generally contains a small quantity of carbon monoxide which is eliminated prior to the synthesis by transforming it into methane by catalysis. Hence, the residual gases of the synthesis consist in a mixture of hydrogen, nitrogen, argon and methane.

In order to avoid the accumulation of argon and of methane in the synthesis gases, it is necessary to eliminate them from the residual gases before introducing said gases again into the cycle of operations of synthesis. The accompanying figure illustrates one form of embodiment of the process according to the present invention as applied to the aforesaid residual gases.

The gaseous mixture to be treated is admitted under pressure at A to the heat exchanger B whence, through pipe C, it is led to the lower portion of the separation column D. It rises in this column in which it is subjected, in the manner hereinafter to be explained, to gradually lower temperatures, thus causing almost the whole of the methane and of the argon, and thereafter a part of the nitrogen, to be progressively condensed, so that the cold compressed gas reaching the top of the column D consists of what has been termed hydrogen hereinabove and in fact is a mixture of hydrogen and some nitrogen. From the top of the column, this hydrogen descends, in counterflow to the ascending gaseous mixture, through a plurality of tubes E, two of which only have been shown. Thus partially reheated, the hydrogen is partially expanded in the first stage F of a compound expander. The hydrogen thus cooled by its partial expansion flows downwardly, in heat exchange with the ascending gaseous mixture, in a plurality of tubes G, of which, here again, only two have been shown. The hydrogen, thus partially reheated again, and partially expanded, undergoes a final expansion in the second stage H of the compound expander. The hydrogen re-cooled by this second partial expansion flows downwardly again for the third time in heat exchange with the gaseous mixture to be separated. This exchange is effected in the group of tubes I. At its egress from this group of tubes, the expanded hydrogen passes into the heat exchanger B in counter current with the gaseous mixture to be cooled.

The liquid mixture of nitrogen, argon and methane which has separated from the hydrogen by liquefaction is collected at the bottom of the column D and is expanded by means of the valve K. It is partially vaporised in the condenser-vaporiser L and it completes its vaporisation in the condenser-vaporiser M. Its vaporisation in these two condensers-vaporisers L and M cools the ascending gaseous mixture and produces a first condensation of the condensible elements thereof. The gaseous mixture of nitrogen, argon and methane issuing from the condenser-vaporiser M transmits its cold to the mixture entering the heat exchanger B.

The admission and expansion pressures at each of the two expansion stages are, if possible, preferably so chosen that the gas, after each expansion, is at a temperature only slightly higher than that at which the nitrogen it contains would liquefy or solidify. When proceeding in this manner, the temperature of the hydrogen is lower after its second expansion than after the first, since the contained nitrogen liquefies or solidifies at temperatures which are the lower, the lower the pressure. It is then preferable not to put the hydrogen issuing from the first expansion into heat exchange with the gaseous mixture at the end of the path followed by said mixture, so that, at the point of said path where the hydrogen issued from the first expansion is put into heat exchange with the gaseous mixture undergoing partial liquefaction, the hydrogen resulting from the second expansion has already been warmed up, by heat exchange with the gaseous mixture, to the temperature of the hydrogen resulting from the first expansion. By thus substantially equalizing the temperatures of the two hydrogen portions which separately cool the gaseous mixture, the heat exchange conditions are improved and the consumption of mechanical energy lowered. This method of operation has been illustrated in the accompanying drawing, in which the group of tubes G rises less high than the group I. Likewise, as the temperature of the hydrogen under pressure entering the group of tubes E is higher than that of the expanded hydrogen entering the group of tubes I, it is preferable to have the group of tubes E rise less high than the group I, as is also shown in the figure.

It may happen that the gaseous mixture to be treated is available under pressure without it being necessary specially to compress it for the purpose of subjecting it to the process of the invention, and that the final pressure to which the hydrogen must be finally expanded is so low that the refrigerating effect generated by its expansion is in excess of that required for the operation of the process. In this case, the working of the apparatus could be adjusted by withdrawing through valve N a variable fraction of the cold hydrogen issuing from the group of tubes I, thereby allowing a portion of the refrigerating effect to become lost.

I claim:

1. A process for separating a mixture of gases having relatively low boiling points into its constituents or into groups of constituents by partial liquefaction comprising causing the gaseous effluent of the partial liquefaction to pass at least three times in succession in heat exchange relationship and in counterflow with the gaseous mixture circulating in a constant direction and being thereby separated, all these heat exchanges terminating substantially in the same zone where said gaseous mixture is being separated, and said gaseous effluent being subjected to at least two expansions with production of external work namely one expansion between two successive heat exchanges.

2. A process as set forth in claim 1, in which the gaseous effluent which has been subjected to expansion is, at least after one of its expansion stages, brought into heat exchange relationship with the gaseous mixture at the end of the path of said mixture.

3. A process as set forth in claim 1, in which the gaseous effluent which has been subjected to expansion is, after its last expansion stage, brought into heat exchange relationship with the gaseous mixture at the end of the path of said mixture.

4. A process as set forth in claim 1, in which the gaseous effluent is brought into heat exchange relationship with the gaseous mixture along portions of the path of the latter the length of which portion is increased from each heat exchange to the following one, the last exchange beginning substantially at the end of said path.

5. A process for extracting hydrogen from a gaseous mixture composed of hydrogen and gases having higher boiling points by partial liquefaction of the gaseous mixture, which comprises passing the hydrogen at least three times in succession, in heat exchange relationship and in counterflow with the gaseous mixture, said hydrogen being subjected to at least two expansions with performance of external work namely one expansion between two successive heat exchanges.

6. A process for stripping from its methane and argon, by partial liquefaction, a gaseous mixture chiefly composed of hydrogen, nitrogen, methane and argon, which comprises passing the stripped mixture of hydrogen and nitrogen at least three times in succession in heat exchange relationship and in counterflow with the gaseous mixture, said mixture of hydrogen and nitrogen being subjected to at least two expansions with performance of external work namely one expansion between two successive heat exchanges.

ALFRED ETIENNE.

REFERENCES CITED

The following references are of record in the file of this patent:

UNITED STATES PATENTS

| Number | Name | Date |
| --- | --- | --- |
| 1,027,817 | Claude | May 28, 1912 |
| 1,212,455 | Claude | Jan. 16, 1917 |
| 1,878,123 | Etienne | Sept. 20, 1932 |

Certificate of Correction

Patent No. 2,534,903                                 December 19, 1950

ALFRED ETIENNE

It is hereby certified that error appears in the above numbered patent requiring correction as follows:

In the grant, line 16, strike out the words "of Seventeen years"; same line, after "grant" insert *until December 19, 1960*; in the heading to the printed specification, line 11, before "6 Claims" insert the following: *Section 1, Public Law 690, August 8, 1946. Patent expires December 19, 1960*; column 2, lines 28 and 29, strike out the words and comma, "in parallel,";

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*